US007861794B2

(12) United States Patent
Tarasinski et al.

(10) Patent No.: US 7,861,794 B2
(45) Date of Patent: Jan. 4, 2011

(54) THREE-POINT IMPLEMENT MOUNTING FOR AN AGRICULTURAL OR INDUSTRIAL UTILITY VEHICLE

(75) Inventors: Nicolai Tarasinski, Frankenthal (DE); Marco Reinards, Bleialf (DE)

(73) Assignee: Deere & Company, Moline, IL (US)

( * ) Notice: Subject to any disclaimer, the term of this patent is extended or adjusted under 35 U.S.C. 154(b) by 132 days.

(21) Appl. No.: 11/921,190

(22) PCT Filed: Apr. 13, 2006

(86) PCT No.: PCT/EP2006/061590

§ 371 (c)(1),
(2), (4) Date: Mar. 10, 2009

(87) PCT Pub. No.: WO2006/111505

PCT Pub. Date: Oct. 26, 2006

(65) Prior Publication Data

US 2009/0200051 A1      Aug. 13, 2009

(30) Foreign Application Priority Data

Apr. 16, 2005    (DE) .................... 10 2005 017 578

(51) Int. Cl.
*A01B 59/06*    (2006.01)

(52) U.S. Cl. ...................................... 172/439
(58) Field of Classification Search ......... 172/439–442, 172/448, 677, 679, 680, 272–274; 180/53.1, 180/53.3; 280/494, 478.1, 479.2, 492, 493, 280/515, 460.1
See application file for complete search history.

(56) References Cited

U.S. PATENT DOCUMENTS

| 5,975,216 A | 11/1999 | Gibbons |
| 6,230,817 B1 | 5/2001 | Haugen |
| 6,257,347 B1 | 7/2001 | Campisi |
| 6,321,851 B1 | 11/2001 | Weiss et al. |
| 6,796,384 B1 | 9/2004 | Potter |

*Primary Examiner*—Robert E Pezzuto

(57) ABSTRACT

A three-point implement mounting for an agricultural or industrial utility vehicle includes an upper member and two lower members. A working implement is coupled to the three-point implement mounting in order to couple the working implement to the utility vehicle. In order to provide an interface between the utility vehicle and the working implement which is versatile and can adapted to the physical application, the three-point implement mounting is of modular design and has a coupling interface for coupling the three-point implement mounting to the utility vehicle.

3 Claims, 4 Drawing Sheets

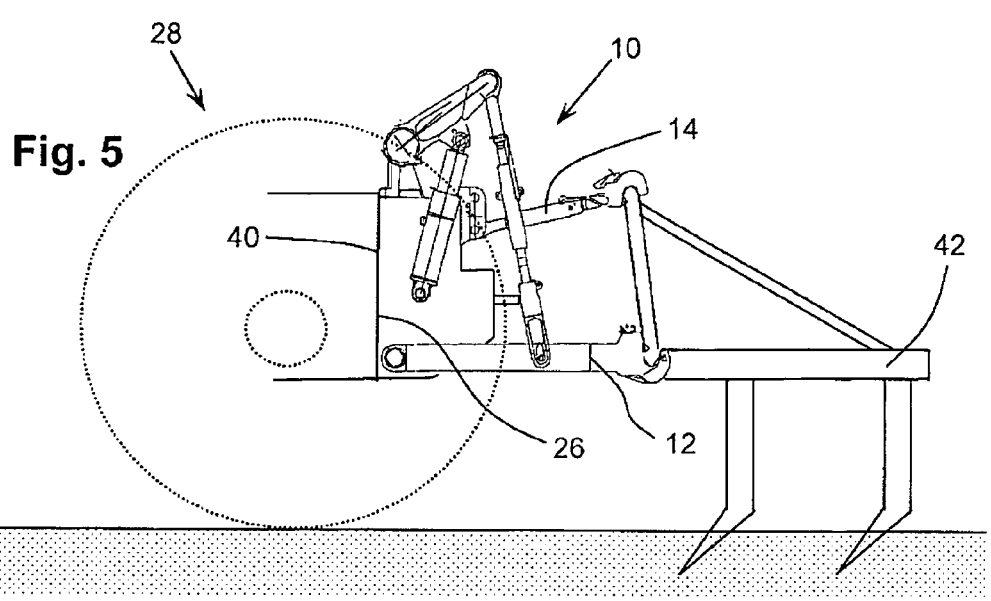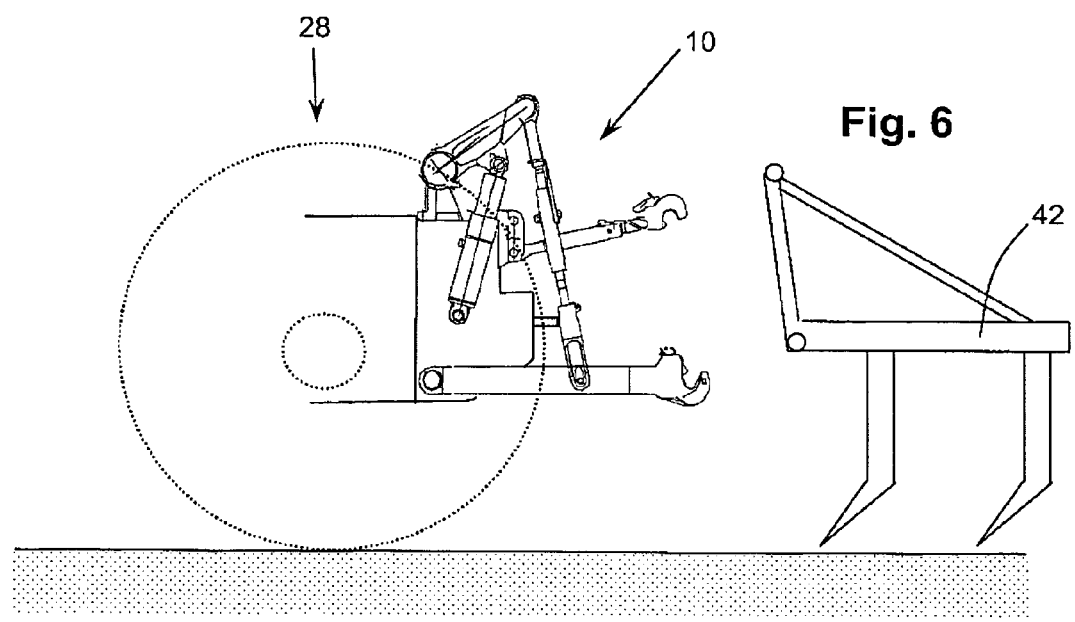

THREE-POINT IMPLEMENT MOUNTING FOR AN AGRICULTURAL OR INDUSTRIAL UTILITY VEHICLE

Figure 1:
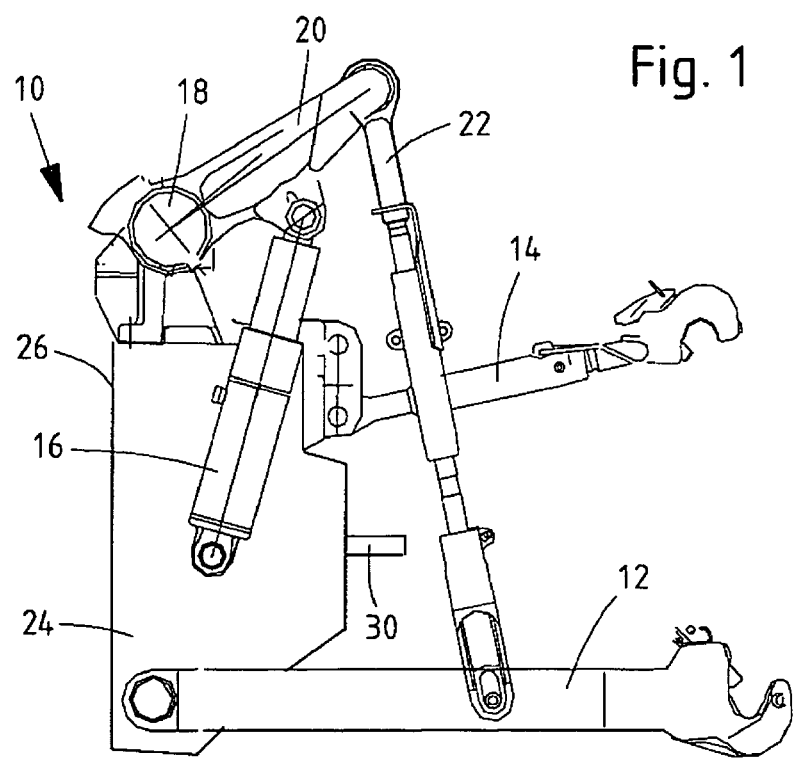

The invention relates to a three-point implement mounting for an agricultural or industrial utility vehicle. The three-point implement mounting comprises an upper member and two lower members. It is possible for a working implement to be coupled to the three-point implement mounting in order to couple the working implement to the utility vehicle. In addition, the present invention relates to an industrial or agricultural utility vehicle, a working implement and a storage system.

A three-point implement mounting is also referred to as a three-point implement structure (hitch), constitutes, within the context of the present invention, an interface between a working implement and a utility vehicle, and is for example defined in the DIN ISO standard 730-1. The components of a conventional three-point implement mounting are conventionally connected, on account of their design, to the frame or the rear axle or the differential housing of the utility vehicle, wherein the utility vehicle can be embodied in particular in the form of a tractor. In this respect, the conventional three-point implement mounting constitutes an interface between the utility vehicle and working implement, via which in particular also mechanical torques can be transmitted, conventionally by means of a power take-off shaft. In other words, a working implement is coupled by means of the components of the three-point implement mounting—specifically in particular by means of the upper member and the two lower members and if appropriate a connecting shaft to the power take-off shaft—to a utility vehicle.

Problematic in a conventional three-point implement mounting are in particular its restricted capabilities in terms of the degrees of freedom which are available in a conventional three-point implement mounting with regard to possible relative movements between the working implement and utility vehicle, which degrees of freedom are predefined on account of the more or less constantly identical arrangement of the upper member and lower members. An improved lateral steering function is provided for example by the implement interface disclosed in DE 199 51 840 A1, which implement interface can, with its connecting elements between the utility vehicle and working implement, have substantially a shape of a hexapod.

The present invention is therefore based on the object of specifying and further refining a three-point implement mounting, an industrial or agricultural utility vehicle, a working implement and a storage system, by means of which said problems are overcome. It is intended in particular to specify an interface between the utility vehicle and working implement which is versatile and can, in terms of its properties, be varied or adapted to the physical application.

The object is achieved according to the invention by means of the teaching of patent claim 1. Further advantageous embodiments and refinements of the invention can be gathered from the subclaims.

According to the invention, a three-point implement mounting of the type specified in the introduction is characterized in that the three-point implement mounting is of modular design and in that the three-point implement mounting has a coupling interface, by means of which the three-point implement mounting can be coupled to the utility vehicle.

The three-point implement mounting is therefore designed in the form of a module and has on the one hand the interface of a conventional three-point implement mounting, that is to say for example an upper member and two lower members, and if appropriate a lifting mechanism which has a lifting arm together with a lifting cylinder and lifting struts. On the other hand, the three-point implement mounting according to the invention has a coupling interface, by means of which the three-point implement mounting can be coupled to the utility vehicle.

Said module can now be adapted onto or coupled to the utility vehicle, so that the utility vehicle has an interface to the working implement, which interface substantially corresponds to a conventional three-point implement mounting interface. If said module is not coupled to the utility vehicle, it is possible for a working implement, which itself has a coupling interface which is of comparable design to the coupling interface which the three-point implement mounting according to the invention has, to be coupled directly to the coupling interface of the utility vehicle to which a three-point implement mounting according to the invention can be coupled. In this respect, in addition to the three-point implement mounting interface, a further interface is provided between the utility vehicle and working implement, which further interface can be selectively used for coupling working implements.

On account of the modular embodiment of the three-point implement mounting according to the invention, the latter could have a housing structure on which the modular units of the interface of a conventional three-point implement mounting could be arranged or fastened.

According to one preferred embodiment, the coupling interface is designed in the form of a quick-action coupling. The quick-action coupling could have at least one locking element and at least one positioning means. The quick-action coupling can be actuated preferably independently of other actuators of the three-point implement mounting—for example independently of a lifting cylinder for a lower member. The locking element can preferably be actuated mechanically, hydraulically or electrically and could have a moveably arranged bolt which could be arranged on the utility vehicle. The bolt can, for locking, be placed at least partially into a corresponding recess, with the recess preferably being provided on the coupling interface of the three-point implement mounting. In concrete terms, therefore, the locking bolt could be arranged on the utility vehicle and could be actuable by means of an electrical input unit by an operator of the vehicle. The locking bolt itself could be arranged so as to be hydraulically moveable, and the electrical input unit could be coupled to a hydraulic valve, so that the locking bolt can be acted on or released with pressurized hydraulic liquid, so that said locking bolt can be moved hydraulically between a locked and an unlocked position.

The positioning means could for example be provided on the three-point implement mounting and/or have at least one projection which could be of frustoconical design. In the coupled state, the projection comes into contact or engagement into a depression which is of substantially complementary design to said projection and is provided for example on the utility vehicle. An alignment of the three-point implement mounting relative to the utility vehicle during the locking process can be at least largely assisted by means of the projection. In addition, the projection or a plurality of projections and the corresponding depression or plurality of depressions could be designed and arranged such that, by means of these, a fixing of the three-point implement mounting to the utility vehicle in the locked state can be at least largely realized.

The coupling interface of the three-point implement mounting and/or of the utility vehicle very particularly preferably has at least one hydraulic quick-action coupling, by means of which a hydraulic load of the three-point implement mounting can be connected to the utility vehicle. Alternatively or in addition, it could be possible for a hydraulic load of a working implement, which is coupled to the utility vehicle by means of the three-point implement mounting or which is coupled directly to the utility vehicle, to be connected to the utility vehicle by means of a hydraulic quick-action coupling. In the latter case, both the coupling interface of the utility vehicle and also the coupling interface of the working implement has in each case one hydraulic quick-action coupling.

In a similar way, the coupling interface of the three-point implement mounting and/or of the utility vehicle could have at least one electrical quick-action coupling, by means of which an electrical load of the three-point implement mounting and/or an electrical load of a working implement which is coupled to the three-point implement mounting and/or to the utility vehicle can be electrically connected.

In addition, the coupling interface of the three-point implement mounting and/or of the utility vehicle could have mechanical means, by means of which a mechanical torque can be transmitted from the utility vehicle via the three-point implement mounting to the working implement, for example in the form of a power take-off shaft transmission module or a power take-off shaft gearing.

The coupling interface preferably has mechanical transmission means, by means of which mechanical tensile forces can be transmitted between the working implement and the utility vehicle. Mechanical transmission means of said type could for example have hooks which, in a state coupled to the utility vehicle, can hook into recesses provided on the utility vehicle. It is also conceivable to combine at least one mechanical transmission means with at least one locking element, for example in such a way that the locking element can on the one hand lock the three-point implement mounting according to the invention to the utility vehicle, and on the other hand can serve for, or can contribute to, the transmission of mechanical tensile or compressive forces.

The three-point implement mounting according to the invention could, in one preferred embodiment, have a lifting mechanism—which is in particular hydraulically actuable—for the lower member of the three-point implement mounting, and/or a power take-off shaft gearing. The lifting mechanism and/or the power take-off shaft could be embodied in each case in the form of an autonomous modular unit, which modular unit(s) can be adapted directly onto the utility vehicle and/or onto the three-point implement mounting. The lifting mechanism could for example have two laterally arranged, double-acting hydraulic cylinders. Each hydraulic cylinder could be articulatedly connected at one end to the three-point implement mounting and at the other end to the lower member or to a lifting arm which is connected to a lifting shaft and a lifting strut/lifting spindle. The lifting arm and the lifting shaft would in this case also be arranged either on the three-point implement mounting or on the utility vehicle, depending on where the lifting mechanism is arranged. A modular unit of said type, which is embodied in the form of an autonomous modular unit, can have a modular unit interface, by means of which the modular unit can be coupled mechanically, electrically and/or hydraulically to the utility vehicle and/or to the three-point implement mounting. For this purpose, the modular unit interface could have mechanical, electrical and/or hydraulic coupling elements.

The three-point implement mounting according to the invention has, in a very particularly preferred embodiment, at least one conventional coupler interface, by means of which a working implement can be coupled to the three-point implement mounting. Said conventional coupler interface could be a trailer coupling, a trailer hook, a trailer ball and/or an adjustable drawbar. Said coupler interface could also be embodied as an autonomous modular unit.

The object specified in the introduction relating to an industrial or agricultural utility vehicle is achieved by means of the features of the claims. According to the claims, an industrial or agricultural utility vehicle is characterized by a coupling interface which is designed such that a coupling interface of a three-point implement mounting can be coupled to it. In this respect, the above-described three-point implement mounting according to the invention can be coupled on the one hand to the coupling interface of the utility vehicle according to the invention. On the other hand, a working implement could also be coupled directly to the utility vehicle if the working implement itself has a coupling interface which is of comparable design to the coupling interface which the three-point implement mounting according to the invention has.

The coupling interface is particularly preferably arranged on the rear side and/or on the front side of the utility vehicle. The coupling interface of the utility vehicle could be provided instead of a conventional three-point implement mounting which is conventionally provided on the utility vehicle.

In a very particularly preferred embodiment, the coupling interface, which is arranged at the rear side, on the utility vehicle is provided at the location at which a conventional three-point implement mounting is conventionally arranged and/or at which a conventional trailer device is conventionally arranged and/or at which the power take-off shaft can conventionally be connected. In concrete terms, the coupling interface which is arranged at the rear side could be arranged or provided on the differential housing of the rear axle of the utility vehicle.

As already indicated above, it could be possible for a working implement to be coupled directly to the coupling interface of the utility vehicle. Said working implement would then have to have a coupling interface which substantially corresponds to a coupling interface of a three-point implement mounting.

The object specified in the introduction relating to a working implement for performing a task is achieved by means of the features of the claims. According to the claims, a working implement, which can be coupled to an industrial or agricultural utility vehicle, is characterized by a coupling interface which substantially corresponds to the coupling interface of a three-point implement mounting. Accordingly, a new and/or modern interface for working implements could be provided, whose properties are improved over the properties of a conventional three-point implement mounting, in particular if said new generation of working implements can be coupled to the above-described coupling interface in a simplified, automated and/or faster manner to the utility vehicle and—depending on the concrete design of the coupling interface—have for example further improved properties with regard to the relative movements between the utility vehicle and working implement. Since a three-point implement mounting according to the invention, which is of modular design, can be coupled to the utility vehicle, it is possible to provide, as before, a conventional three-point implement mounting interface at the utility vehicle side for working implements which are already in use or belong to the old generation.

The object specified in the introduction regarding a storage system is achieved by means of the features of the claims. According to said claim, a storage system according to the invention is suitable for holding or storing a three-point implement mounting and/or for holding or storing a working implement, and is characterized in that, in order to couple a three-point implement mounting which is held or stored in the storage system, or a working implement which is held or stored in the storage system, to a utility vehicle, the utility vehicle is driven up to the storage system. The three-point implement mounting or the working implement can be positioned with its coupling interface relative to the coupling interface of the utility vehicle. A direct coupling of the three-point implement mounting or of the working implement to the utility vehicle can therefore take place. In other words, the storage system according to the invention could be designed similarly to a tool magazine in machine tools, where, depending on a task to be performed, a robot grasps in each case a different tool, which is usually mounted in the tool magazine, and performs work with said tool. A utility vehicle designed in the form of a tractor could therefore be driven, with the coupling interface provided on the tractor, up to a predefinable/predefined position on the storage system in order to couple a corresponding working implement to the tractor. In the same way, the tractor could, after having performed a task (for example ploughing or sowing) with the working implement, deliver the working implement—if appropriate together with the modularly-designed three-point implement mounting according to the invention—back to the storage system after having driven up to the storage system, in order, under some circumstances, to couple another working implement which is stored in the storage system.

According to one preferred embodiment, the storage system has at least one positioning means, by means of which a three-point implement mounting which is held by the storage system, and/or a working implement which is held by the storage system, can be positioned relative to the utility vehicle, so that a coupling of the three-point implement mounting to the utility vehicle is possible. The positioning means could for example have an adjustable table which is adjustable in the vertical and/or horizontal direction and on which is situated a three-point implement mounting and/or a working implement.

Relative positioning between the utility vehicle and the three-point implement mounting or working implement could be assisted during the coupling process, that is to say when the utility vehicle grasps for example a working implement from the storage system, with the aid of sensor means which are preferably provided at the coupling interfaces of the utility vehicle, the three-point implement mounting and/or the working implement. Sensors of said type could operate on an electric, magnetic and/or optical basis.

Figure 7:
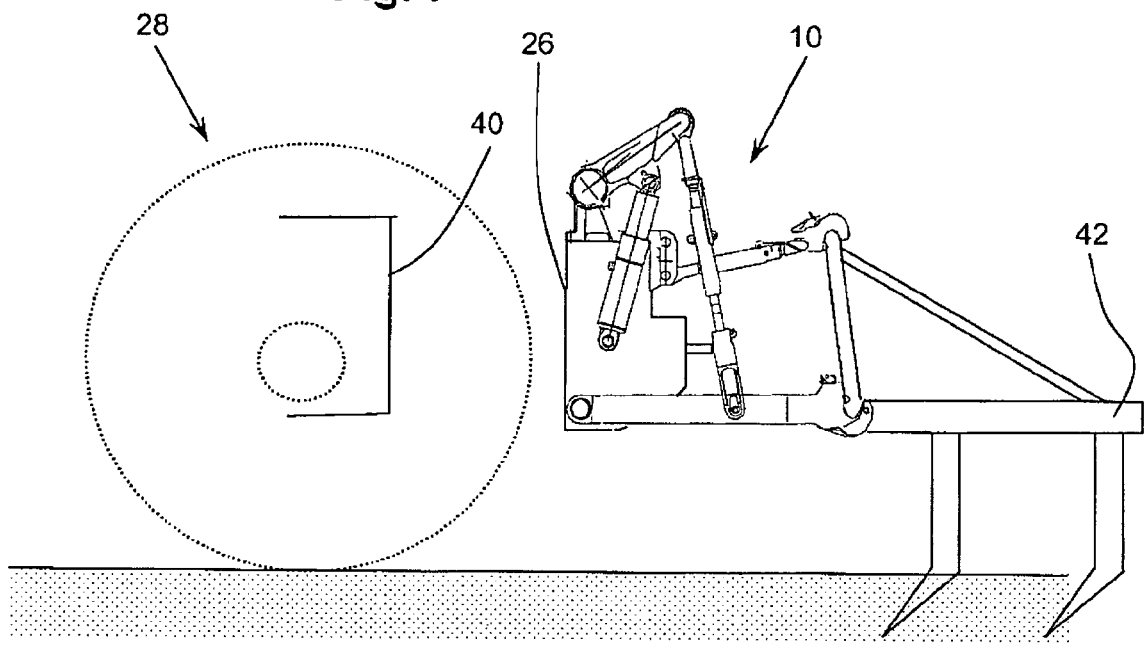

There are now various possibilities for the advantageously configuring and refining the teaching of the present invention. In this regard, reference is made on the one hand to the patent claims which are subordinate to the independent patent claims and on the other hand to the following explanation of the preferred exemplary embodiments of the invention on the basis of the drawing. Generally preferred embodiments and refinements of the teaching are also explained in connection with the explanation of the preferred exemplary embodiments of the invention on the basis of the drawing. In the drawing, in each case in a schematic illustration and in each case in a side view, FIG. 1 shows a first exemplary embodiment of a three-point implement mounting according to the invention, FIG. 2 shows a second exemplary embodiment of a three-point implement mounting according to the invention, FIG. 3 shows a three-point implement mounting similar to FIG. 1, in a state coupled to a utility vehicle, FIG. 4 shows the three-point implement mounting from FIG. 3, in a state decoupled from the utility vehicle, FIG. 5 shows a three-point implement mounting similar to FIG. 1, in a state coupled to a utility vehicle, with a working implement being coupled to the three-point implement mounting, FIG. 6 shows the three-point implement mounting from FIG. 5, in which the working implement is decoupled from the utility vehicle and three-point implement mounting, and FIG. 7 shows a three-point implement mounting which is decoupled from a utility vehicle and to which a working implement is coupled, with the three-point implement mounting and working implement being of similar design to FIG. 5.

In the figures, the same or similar components are denoted by the same reference symbols.

Figure 2:
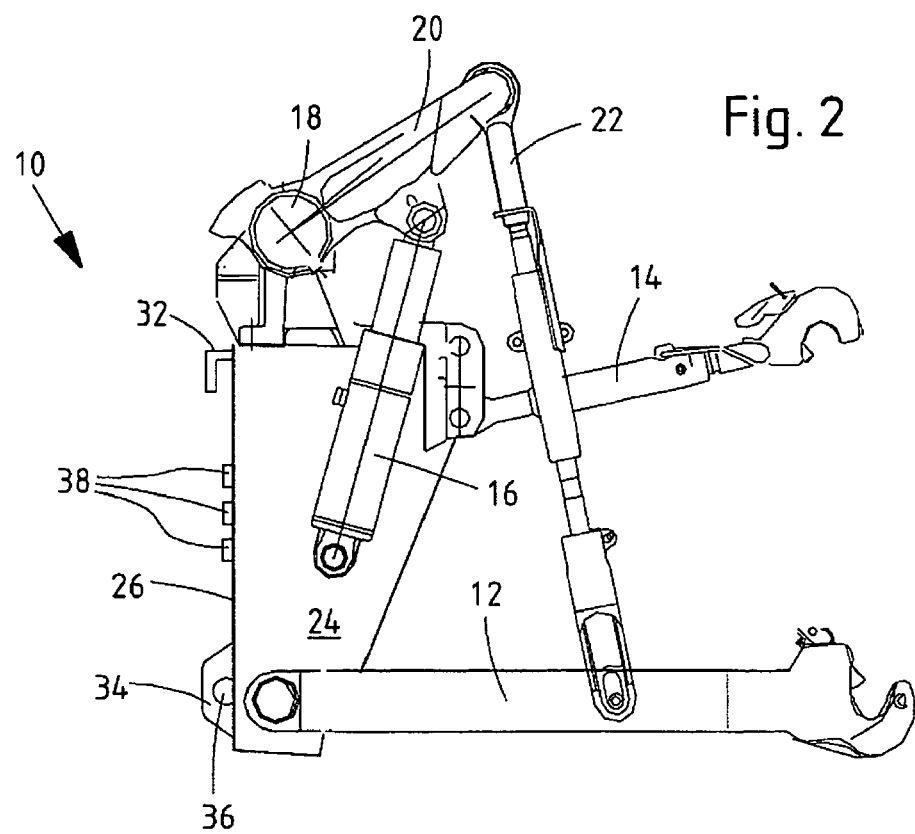

FIG. 1 shows a first exemplary embodiment of a three-point implement mounting 10 according to the invention in a side view. The three-point implement mounting 10 comprises two lower members 12 which are arranged laterally with respect to the vehicle longitudinal axis and in a lower region, only one of which lower members 12 is shown on account of the side view. In addition, the three-point implement mounting 10 comprises an upper member 14, two hydraulic cylinders 16, a lifting shaft 18, two lifting arms 20 and two lifting struts or lifting spindles 22. The three-point implement mounting 10 comprises a housing 24 to which the one end of a lower member 12 is rotatably/pivotably articulatedly connected. In addition, the piston-space-side end of the hydraulic cylinder 16 and the one end of the upper member 14 is articulatedly connected to or rotatably mounted on the housing. The arrangement and mode of operation of the upper member 14, the lower members 12, the lifting cylinder 16, the lifting shaft 18, the lifting arms 20 and the lifting spindles 22 substantially correspond to those of a conventional three-point implement mounting as have been long known from the prior art.

Figure 3:
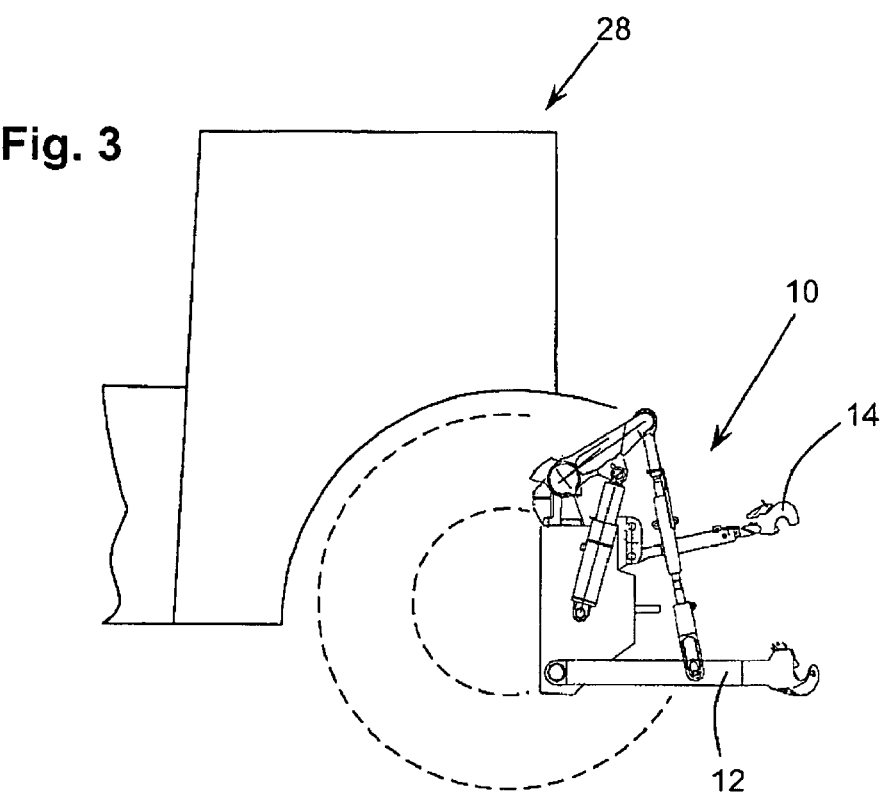
Figure 4:
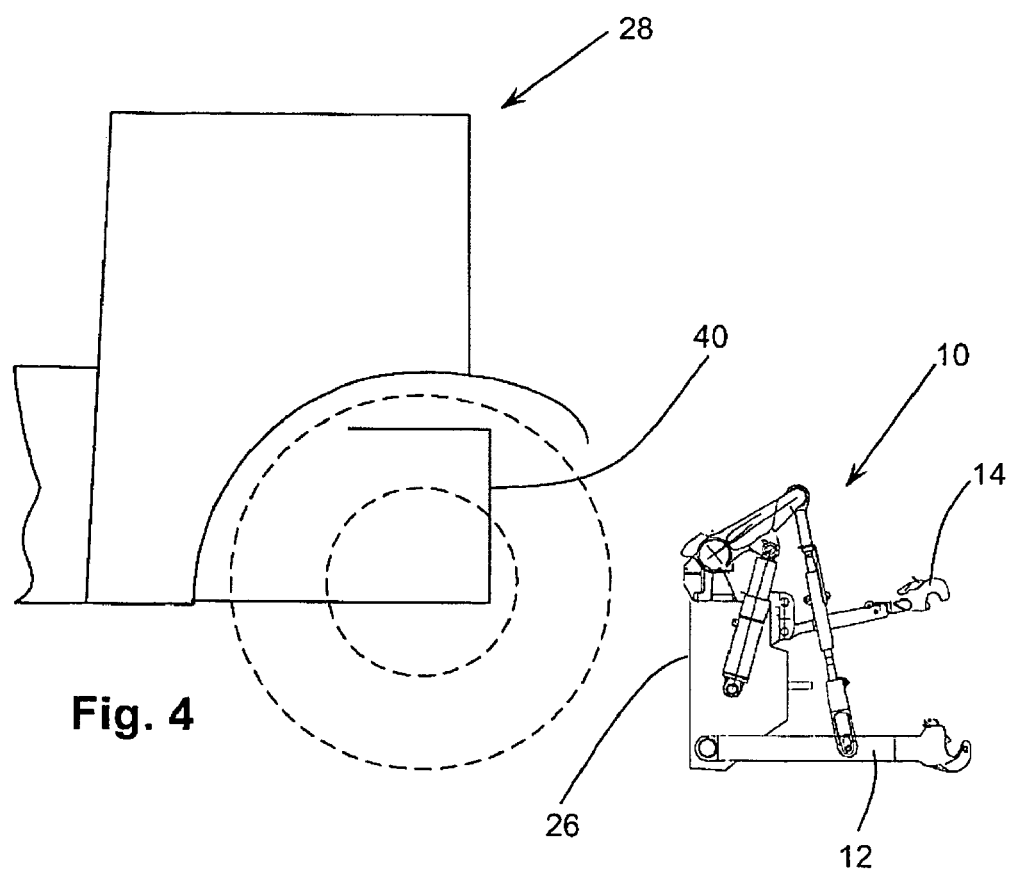

The three-point implement mounting 10 according to the invention from FIG. 1 is of modular design and has a coupling interface 26—merely shown schematically in FIG. 1—by means of which the three-point implement mounting can be coupled to a utility vehicle 28—shown partially by way of example in FIG. 3 or 5. The housing 24 of the three-point implement mounting from FIG. 1 has a power take-off shaft stub 30 which can be connected fixedly in terms of torque to a power take-off shaft (not illustrated) of a utility vehicle 28.

FIG. 2 shows, in a side view, a second exemplary embodiment of a three-point implement mounting 10 according to the invention, which three-point implement mounting 10 differs from the three-point implement mounting 10 from FIG. 1 substantially in that no power take-off shaft stub is provided therein. FIG. 2 however shows further components of the coupling interface 26 which—like the coupling interface 26 from FIG. 1—is designed in the form of a quick-action coupling. The coupling interface 26 from FIG. 2 has two hooks 32 which are arranged laterally and in the upper region of the housing 24, only one of which hooks 32 is shown on account of the side view. Said hooks 32 hook, in a coupled state of the three-point implement mounting 10, into recesses (not shown in FIG. 1) which are provided on a corresponding coupling interface 40 of the utility vehicle 28. Also provided on the coupling interface 26 is a locking element 34 which is arranged centrally and in the lower region of the housing 24. The locking element 34 has a recess 36 into which a locking bolt (not shown), which is provided on the utility vehicle 28, can engage or extend in order to lock the three-point implement mounting 10 to the utility vehicle 28. The locking element 34—likewise indicated merely schematically—is designed in the form of a frustoconical projection, and can come into contact in a recess (not shown in the figures) which is provided on the utility vehicle 28 and is of substantially complementary design, as a result of which, on the one hand, the three-point implement mounting 10 can be aligned or positioned relative to the utility vehicle 28 during the locking process. In addition, the locking element which is of frustoconical design also serves to fix the three-point implement mounting 10 to the utility vehicle 28 in the locked state. Both the hook 32 and also the locking element 34 therefore also serve as a transmission means, by means of which mechanical tensile and/or compressive forces can be transmitted between the working implement and utility vehicle 28. Since, during the locking process, on account of the arrangement which is indicated schematically in FIG. 2, the hook 32 of the three-point implement mounting 10 is hooked into the recesses provided for the hooks 32 substantially in the vertical direction from top to bottom, and therefore the entire three-point implement mounting 10 must be moved from top to bottom, the recess provided on the utility vehicle 28 for the locking element must be designed to be elongate in the vertical direction and so as to taper from top to bottom. During the locking process, therefore, said part of the coupling interface 26 can come into contact with the coupling interface provided on the utility vehicle 28, and during the lowering or hooking-in of the three-point implement mounting 10 into the elongate recess, can be moved downward and, on account of the tapering, can be positioned centrally or centered.

In FIG. 2, electrical or hydraulic interfaces 38 on the coupling interface 26 are additionally indicated merely schematically, which electrical or hydraulic interfaces 38 are designed in the form of quick-action couplings and can be connected to corresponding counterparts on the coupling interface 40 of the utility vehicle 28. The lifting cylinder 16 of the three-point implement mounting 10 can be connected to a hydraulic circuit of the utility vehicle 28 by means of the interfaces 38. It is however also possible for further electrical and/or hydraulic interfaces to be provided on that side of the three-point implement mounting 10 which faces towards the working implement, to which interfaces corresponding connecting lines of a working implement can be connected, and by means of which interfaces components of a coupled-on working implement can likewise be supplied electrically or hydraulically.

FIG. 3 shows, in a schematic side view, the state in which a three-point implement mounting 10 according to the invention is coupled to the utility vehicle 28. The utility vehicle 28, in connection with the three-point implement mounting 10, therefore provides a conventional three-point implement mounting interface for a working implement (not shown in FIG. 3). In FIG. 4, the three-point implement mounting 10 is decoupled from the utility vehicle 28, so that a working implement (not shown in the figures) can be coupled to the coupling interface 40 of the utility vehicle 28. A working implement of said type has a coupling interface which is for example of similar design to the coupling interface 26 of the three-point implement mounting 10 from FIG. 2. In FIG. 4, the coupling interface 40 of the utility vehicle 28 is arranged at the rear side, specifically where a conventional three-point implement mounting would conventionally be provided.

FIG. 5 shows, in a schematic side view, a three-point implement mounting 10 according to the invention in a state coupled to the utility vehicle 28. Coupled to the three-point implement mounting 10 by means of the upper member 14 and the two lower members 12 is a working implement 42 designed in the form of a plough. In this regard, the working implement 42 has an interface which is of compatible design to that of a conventional three-point implement mounting. FIG. 6 shows the working implement 42 in a state decoupled from the utility vehicle 28 and from the three-point implement mounting 10. The utility vehicle 28 with the three-point implement mounting 10 coupled thereto can therefore couple on another working implement having a conventional three-point implement mounting interface. FIG. 7 shows, in a schematic view, a state in which the three-point implement mounting 10 according to the invention and the working implement 42 is decoupled from the utility vehicle 28. The utility vehicle 28 could therefore, with its coupling interface 40, couple on a working implement (not shown in FIG. 7) which has a coupling interface which is similar to the coupling interface 26 of the three-point implement mounting 10.

Finally, it is pointed out very particularly that the exemplary embodiments discussed above serve merely to describe the claimed teaching, but do not restrict said teaching to the exemplary embodiments.

The invention claimed is:

1. A three-point hitch assembly for coupling a working implement to a utility vehicle, the hitch assembly having an upper link and two lower links, characterized in that:
    the hitch assembly comprises a housing, one side of the housing supporting coupler interface elements, the coupler interface elements being adapted for coupling corresponding elements on the utility vehicle, the coupler interface elements including a lower locking element and an upper hook, the lower locking element comprising a projection with a frustoconical shape, the projection being adapted to engage a corresponding recess on the utility vehicle so that the projection assists in positioning and locking the hitch assembly to the utility vehicle, and the upper hook being adapted to hook into a corresponding recess on the utility vehicle.

2. The hitch assembly of claim 1, characterized in that:
    the coupling interface includes a hydraulic quick-action coupler for hydraulicly coupling the hitch assembly or the implement to the utility vehicle.

3. The hitch assembly of claim 1, wherein:
    the coupling interface includes an electrical quick-action coupler for electrically coupling to an electrical load.

\* \* \* \* \*